Jan. 7, 1947.   J. MERCIER   2,413,840
PIPE COUPLING
Filed May 24, 1944
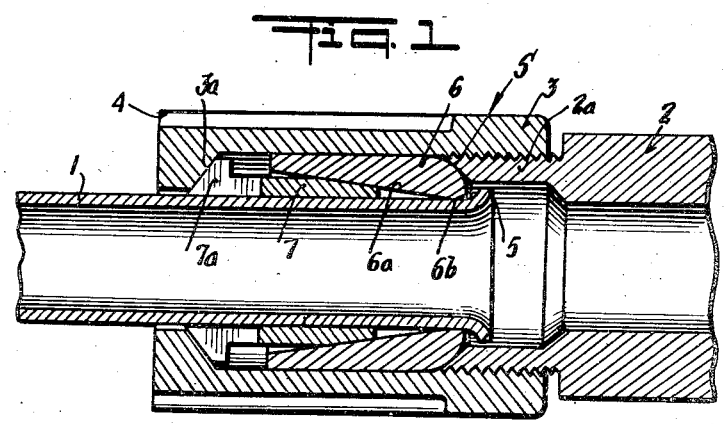
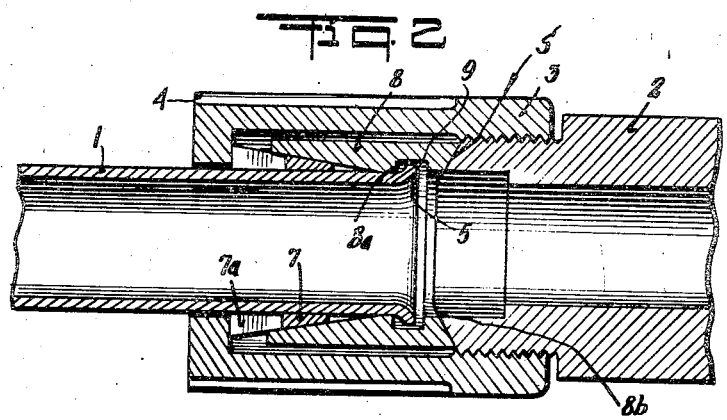
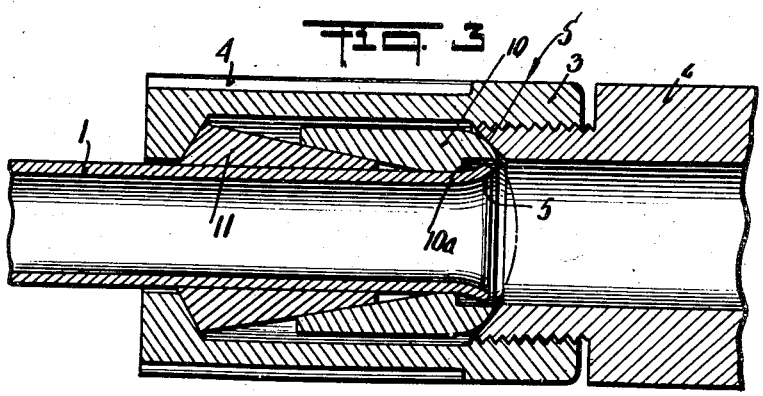
INVENTOR.
Jean Mercier
BY Mocier Blum
ATTORNEYS Patented Jan. 7, 1947

2,413,840

UNITED STATES PATENT OFFICE 2,413,840

PIPE COUPLING

Jean Mercier, New York, N. Y.

Application May 24, 1944, Serial No. 537,029

2 Claims. (Cl. 285—123)

My invention relates to a new and improved coupling.

One of the objects of my invention is to provide a coupling which comprises respective pipe members, or a pipe member and a coupling head, which are connected so as to provide a leak-tight joint.

Another object is to provide a coupling wherein the connected pipe members are held securely against considerable longitudinal force.

Another object of my invention is to provide an improved coupling, for connecting a tube whose wall is thin and deformable, to another tube or to a coupling-head which has a thick and rigid and non-deformable wall.

Other objects are to provide a coupling which can be disassembled without deforming the thin-walled tube; to maintain the sealing members in sealing condition upon the thin-walled tube when it is uncoupled from the coupling-head or other tube; to provide a coupling which will be resistant to vibration; and to provide a coupling which has three longitudinal sections, one section taking up vibration, a second section being a sealing section, a third section holding the coupled parts against outward longitudinal movement.

Other objects of my invention will be stated in the annexed description and drawing which illustrate preferred embodiments thereof.

Fig. 1 is a longitudinal sectional view which illustrates one embodiment of my invention. This illustrates a part of the coupling head 2.

Figs. 2 and 3 are respective longitudinal sectional views which illustrate respective different embodiments of my invention. The coupling-head 2 is symmetrical and a pipe line of any length can be secured by connecting a series of tubes and coupling-heads.

Without limiting the field of use of the invention, it is particularly intended for use in connecting the pipes of a pipe line or system, which is used to transmit liquids under high pressure, such as a pressure of 5,000 lbs. per square inch or more. Such pipe systems are used extensively in the hydraulic control-systems of airplanes, and for other purposes.

Fig. 1 shows a thin-walled pipe 1 and a pipe or coupling-head 2. The inner end 5 of the pipe 1 is initially of cylindrical contour, and of the same diameter as the body of the pipe 1. As an example, the wall of the thin-walled pipe or tube 1 can be of stainless steel, whose thickness is one millimeter. The internal diameter of such tube 1 is ten millimeters. The pipe or coupling-head 2 is provided with a threaded end portion 2a.

The member 2 has a thick and substantially non-deformable wall. A collar 3 is provided with an internally threaded end portion, which engages the thread of the end portion 2a of the pipe 2. Said collar 3 is provided with a plurality of ribs or grooves 4, by means of which said collar 3 can be screwed into position by means of a pipe wrench, with considerable force. The ring 6 is rigid and it is provided with a frusto-conical internal wall 6a. The angle of wall 6a with the longitudinal axis of the tube 1 is 4° to 7°. This ring 6 is made of hard metal, such as steel, in order to bite into the wall of the pipe 1 when said wall is deformed by enlarging the end-portion 5 of pipe 1. Said pipe 1 may be optionally made of brass or other alloy which is softer than the material of the ring 6. The wall of said pipe 1 can be made of any material. The gasket ring 7 is made of copper, lead, aluminum alloy, or other suitable material which can be deformed under high pressure. Said gasket ring 7 has a longitudinally split end portion 7a. At its end portion 7a, the ring 7 may have one or more longitudinal slits.

The ring 3 has a frusto-conical wall 8a, which abuts the corresponding frusto-conical end wall of the split end portion 7a. The angle of these abutting end-walls with the common longitudinal axis of members 1 and 2, is 30°-60°. Adjacent the frusto-conical wall 6a of the ring 6, the gasket ring 7 may initially be formed with a frusto-conical wall which initially abuts said frusto-conical wall 6a. If desired, the initial shape of the continuous body of the ring 7, at the right of the split end portion 7a, can be cylindrical. In such case, the gasket ring 7 will be finally deformed into the shape shown in Fig. 1, by the longitudinal pressure which is exerted by the clamping collar 3.

The pipe 2 is formed with a frusto-conical seat S, and in the assembled coupling, a portion of the ring 6 abuts said frusto-conical seat S.

In order to complete the coupling between the pipes 1 and 2, said pipes are assembled while the pipe 1 is in its initial cylindrical shape. The rings 6 and 7 are assembled between the pipe 1 and the clamping collar 3. When the clamping collar 3 is tightened by screwing the same upon the thread of the end portion 2a, the gasket ring 7 is deformed and compressed, so that it forms a fluid-tight seal.

The slitted portion of the gasket ring 7 absorbs all vibration, so that the unslitted sealing portion of gasket ring 7 is not affected by vibration. This is particularly important if the tube 1 has a thin and easily deformable wall. In such case, the tube 1 will break at the sealing portion of the gasket ring, where a maximum stress exists, unless the vibration is sufficiently absorbed in a part of the gasket ring which is spaced from its sealing portion.

As an example, in using the above-mentioned thin-walled stainless steel tube, the total length of the gasket ring 7 is about twelve millimeters, that is, slightly in excess of the internal diameter of the tube 1. In such illustrative example, the gasket ring 7 is made of Duralumin, and the length of the slitted part 7a is four millimeters.

Fig. 1 shows the parts of the device in their final assembled position. In such position, the edge 6b of the collar 6 which is close to or which abuts the flared external wall of the pipe 1, bites into said external wall, thus providing a strong mechanical connection between the collar 6 and the pipe 1. After the collar 3 has been tightened into its final position, a suitable tool can be introduced through the pipe 2, in order to enlarge the end portion 5 of the pipe 1. This enlargement of said end portion 5 bends the material of the wall of the pipe 1 along a continuous transverse circular line, at the edge 6b of the collar 6. The edge 6b then bites into the material of the pipe 1, and this connection, together with the enlarged flared shape of the end-portion 5, acts as a positive stop, to prevent the pipe 1 from being forced longitudinally out of assembled position, by the pressure of the fluid or other longitudinal force. That is, when the parts are assembled and tightened as shown in Fig. 1, the frusto-conical wall 3a and the abutting end-wall of the split end-portion 7a, prevent the gasket ring from being forced longitudinally outwardly from the collar 3. Since the gasket ring 7 is made of copper or lead or aluminum alloy, which is deformed only under high pressure, said gasket ring acts as a stop to prevent the rigid collar 6 from being forced longitudinally to the left of its assembled position. The transverse enlargement of the coupling end-portion 5 of pipe 1 begins directly at edge 6b or closely adjacent thereto. This applies to the other embodiments.

I thus provide three main mechanical functions, at longitudinally spaced respective parts at the coupling. The vibration is absorbed, either wholly or in major part, at the portion 7a. The sealing effect and possibly the absorption of some of the vibration, are produced at the unslitted part of gasket ring 7. The longitudinal mechanism holding effect is produced at the edge 6b of the collar 6, so that no longitudinal force, or at least no objectionable longitudinal force, is imposed upon the gasket ring 7.

In the embodiment of Fig. 2, the pipe 2 is provided with a frusto-conical seat S, the direction of whose taper is opposite to the direction of taper of said seat S in Fig. 1. The ring 6 is replaced by a ring 8 which has an annular circumferential groove 9 in which the enlarged end portion 5 is located. This provides additional resistance against longitudinal separation between the pipes 1 and 2.

In the embodiment of Fig. 2, the collar 3 has an annular end-wall which is perpendicular to the common longitudinal axis of the pipes 1 and 2. This abutting end-wall of the collar 3 abuts a corresponding end-wall of the slitted portion 7a of the gasket ring 7.

The assembly of the embodiment of Fig. 2 is the same as the assembly of Fig. 1. In Fig. 1, the biting edge of the collar 6 is designated by the reference numeral 6b, and in Fig. 2, the biting edge of the hard ring 8 is designated by the reference numeral 8a.

Fig. 3 shows a biting ring 10, which has a biting edge 10a. Fig. 3 also shows a gasket ring 11, made of lead or other material which can be deformed under high pressure, and shaped differently from the gasket ring 7 of Figs. 1 and 2. The biting ring 10 is provided with an annular recess, adjacent its biting edge 10a. The assembly of the embodiment of Fig. 3 is the same as above described.

I have disclosed preferred embodiments of my invention, but it is clear that numerous changes and omissions and additions can be made without departing from its scope. The invention also covers sub-combinations of the complete combinations disclosed herein.

For convenience, pipe 2 is designated as the outer pipe, and pipe 1 is designated as the inner pipe, and collar 6 is designated as the holding collar. The portion of pipe 1 which is located inwardly of clamping collar 3, is designated as its coupling-portion. As shown in Fig. 2, the invention is not limited to the type of coupling in which part of one pipe is located inwardly of the associated pipe.

In each embodiment, the holding collar abuts the outer wall of said coupling-portion, between the tip of the transversely enlarged end-portion 5 and the other end of inner pipe 1.

The invention is not limited to a transversely continuous holding collar, or to a transversely continuous gasket collar, or to a transversely continuous enlargement 5.

In one aspect of my invention, the member 6 or 8 or 10 is a holding member which is held fixed relative to the pipes.

The pipe 1 has a transverse member, namely, the enlargement 5 or other means, which hold said pipe 1 relative to an end-face of said holding member 6 or 8 or 10, to prevent said pipe 1 from being longitudinally displaced under the pressure of fluid, gaseous or liquid, in the pipe line.

In Figs. 1 and 2, the maximum transverse diameter of enlargement 5 exceeds the internal diameter of pipe 2. In Fig. 3, the internal diameter of pipe 2 exceeds the maximum transverse diameter of enlargement 5. Hence, in the embodiment of Fig. 3, the pipe 1 may be deformed or it may be shaped initially with the enlargement 5, prior to assembling the parts of the joint or coupling. The collar 3 can hold the holding collar or member directly in fixed position, or through the member 7.

As an example, when the collar 3 is unscrewed, in the embodiment of Fig. 1, the collar 6 and the gasket ring 7 remain assembled as a sub-unit with the pipe 1. Due to the small angle of wall 6a with the axial direction, the gasket ring 7 is held in sealing position, without creeping or slipping from said sealing position. After the coupling has been disassembled, it can be re-assembled, all without imposing objectionable stress upon the thin-walled tube. The same advantages specified herein apply to all the embodiments.

In Fig. 2, I prefer that the diameter of the wall-portion 8b of the collar 8, should be slightly less than the normal external diameter of the cylindrical part of tube 1, and greater than the normal internal diameter of said tube 1.

For convenience, the member 2 may be designated as a pipe or as a pipe-member, in defining the invention in one or more claims, since member 2 may be a pipe or a coupling head.

I claim:

1. A pipe-coupling which comprises a pipe and a pipe-member which is assembled with said pipe, an outer rigid collar which is longitudinally movable relative to said pipe and said pipe-member, means operative to hold said outer collar fixed to said pipe-member, an inner rigid collar located intermediate said outer collar and the outer wall of said pipe, said inner collar abutting the outer wall of said pipe at only a single edge of said inner collar, said pipe having an enlargement adjacent said edge, said enlargement being located to oppose the longitudinal movement of said pipe away from said pipe-member, said inner collar having a wall which abuts a wall of said pipe-member, a gasket, a part of said gasket being located intermediate and abutting said inner collar and said outer wall of said pipe, another part of said gasket being spaced longitudinally from said inner collar in a direction away from said pipe-member, said outer collar having a transverse wall which abuts a transverse wall of said other part of said gasket, said outer collar longitudinally forcing said inner collar and said gasket towards said pipe-member when said outer collar is moved longitudinally towards said pipe-member, said outer collar holding said abutting walls of said inner collar and of said pipe-member in abutting relation, said other part of said gasket being more easily compressible than the first-mentioned part of said gasket.

2. In combination with an outer pipe and an inner pipe, a coupling-part of said inner pipe being located in said outer pipe, the end-portion of said coupling-part having a transverse enlargement, a rigid clamping collar, said outer pipe having an external thread, said clamping collar having an internal thread which engages said external thread, said clamping collar surrounding said coupling-part, a rigid holding collar which fits substantially snugly in said clamping collar, said rigid holding collar abutting the outer wall of said inner pipe only at the end of said holding collar which is adjacent said enlargement, a gasket collar which has an outer wall which abuts the inner wall of said holding collar, said gasket collar also having an inner wall which abuts the outer wall of said inner pipe, said clamping collar having a transverse wall which abuts a transverse wall of said gasket collar, said gasket collar and said holding collar being located longitudinally between said abutting transverse walls and said enlargement, said end-wall of said outer pipe being located longitudinally between said transverse enlargement and the end of said holding collar which is adjacent said enlargement, said clamping collar holding said gasket collar under longitudinal pressure.

JEAN MERCIER.